June 2, 1953     D. W. FENTRESS     2,640,317
JET ENGINE TAIL PIPE ASSEMBLY
Filed May 17, 1946
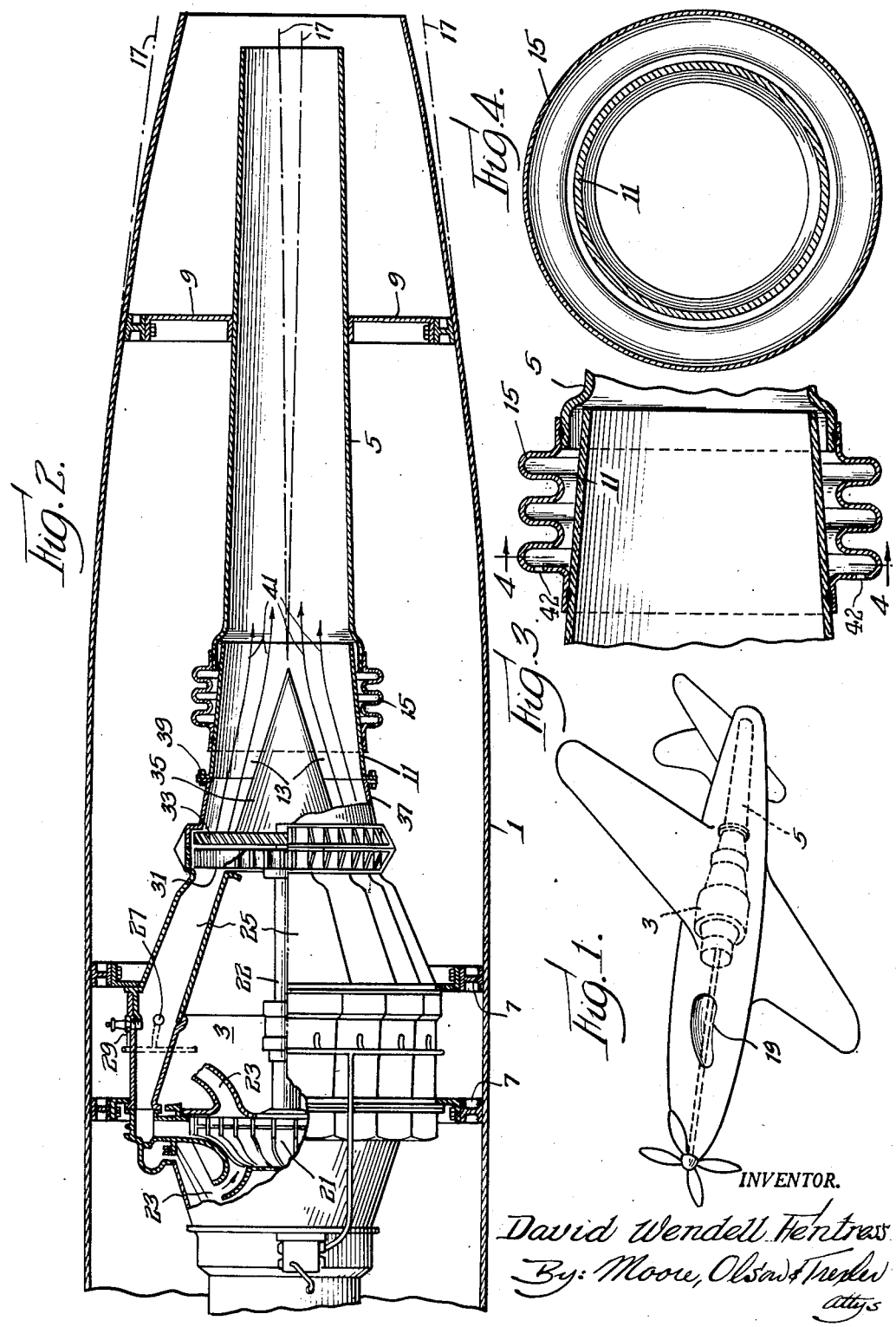
INVENTOR.
David Wendell Fentress
By: Moore, Olson & Trexler
attys Patented June 2, 1953

2,640,317

UNITED STATES PATENT OFFICE 2,640,317

JET ENGINE TAIL PIPE ASSEMBLY

David Wendell Fentress, Barrington, Ill., assignor to Chicago Metal Hose Corporation, Maywood, Ill., a corporation of Illinois Application May 17, 1946, Serial No. 670,588

2 Claims. (Cl. 60—35.6)

The present invention pertains in general to improvements in jet engines and, in particular, to improvements in the mounting of such engines in an aircraft fuselage or frame structure.

In aircraft employing jet engines for propulsion, it is customary to support the engine body on the aircraft frame, in a nacelle section of the body or wings, and provide an exhaust or tail cone pipe to conduct the hot gases expelled through the nozzle of the engine rearwardly to the atmosphere. If the exhaust pipe is relatively long, as is generally the case, it becomes desirable to provide independent support means therefor. Due to the extremely high temperature of the exhaust gases, a relatiively high longitudinal expansion of the exhaust pipe takes place when the engine is in use. It is therefore inadvisable to rigidly secure both the engine body and the exhaust pipe to the frame at widely separated points if the engine body and exhaust pipe are an integral unit, because such mounting would introduce damaging stresses in the aircraft frame structure when expansion of the exhaust pipe occurs. If the engine body and exhaust pipe are fixedly secured to the frame at widely spaced points, then considerable angular displacement between the axis of the exhaust pipe and the axis of the engine will also tend to take place due to the flexing of the aircraft frame which occurs in normal flight.

It is an object of the present invention to provide an improved means for coupling an exhaust pipe to a jet engine in fluid-tight relation while permitting angular and longitudinal displacement therebetween.

Another object of the invention is to provide an improved coupling means, in accordance with the preceding object, which does not interfere with the normal flow of gases through the engine and exhaust pipe.

A further object of the invention is to provide a means for coupling an exhaust pipe to a jet engine which facilitates removal and replacement of the engine from its mounting by enabling ready alignment of the exhaust pipe with the engine.

Still another object of the invention is to provide a jet propulsion engine having an exhaust pipe flexibly coupled to the nozzle of the engine, wherein a portion of the engine nozzle also serves as a baffle to prevent impingement of the hot gases expelled therethrough on the flexible coupling.

The above and other objects of the invention, together with further features and advantages thereof, will best be understood upon a perusal of the following specification taken in conjunction with the accompanying drawing, wherein:

Fig. 1 is a perspective view of an airplane in flight indicating the positions of a jet propulsion engine and exhaust pipe therefor in the airplane fuselage, Fig. 2 is a longitudinal sectional view disclosing details of the mounting of the engine and exhaust pipe in the airplane fuselage, Fig. 3 is an enlarged sectional view of the flexible coupling member connecting the engine to the exhaust pipe, and Fig. 4 is a sectional view taken transversely to the axis of the coupling member shown in Fig. 3, along the line 4—4 thereon.

In the embodiment of the invention disclosed in Figs. 1-4, by way of illustration, there is shown an airplane having a fuselage 1, a jet propulsion engine 3 mounted near the center of the fuselage 1, and an exhaust pipe 5 extending between the engine 3 and an opening at the rear end of the fuselage. The fuselage 1 includes a pair of frame rings 7 for supporting the engine 3. Exhaust pipe 5 is secured, preferably near the center thereof, to the fuselage 1 by means of an annular flanged member 9. One end of exhaust pipe 5 aligns with one end of a frusto-conically shaped member 11 forming a part of the nozzle 13 of engine 3. The member 11 is coupled to the exhaust pipe 5 by means of a flexible member 15 which in the particular preferred embodiment illustrated consists of a relatively thin walled flexible tube, preferably of stainless steel, Inconel or other heat resisting material, having a series of annular corrugations therein. One end of flexible member 15 is sealed, preferably by welding, to the frusto-conically shaped member 11 between the ends thereof, and the other end of flexible member 15 is sealed, preferably by welding, to one end of exhaust pipe 5, which is flared outwardly and formed to fit over the abutting end of the conical member 11 in such manner as to avoid any irregularities in the path of the exhaust gases which flow therethrough. The parts are positioned to provide sufficient clearance to allow for the angular displacement of the axes of the member 11 and exhaust pipe 5, due to the flexing of the fuselage which occurs during flight and is indicated by lines 17, and to allow for the longitudinal expansion which occurs when these parts are heated by the exhaust gases.

The flexible coupling member is constructed in accordance with the general principles laid down in my prior Patent 2,337,038, issued December 21, 1943, wherein a flexible coupling member is used in the exhaust pipe leading from an internal combustion engine; but particular problems arise in conjunction with a jet engine, as will be more fully described hereinafter, and which are solved by the structures and arrangements provided in accordance with the present invention.

In the operation of engine 3 air is admitted to the interior of fuselage 1 through ports, such as 19, therein. A rotary impeller 21 of the centrifugal type, which is driven at high speed from shaft 22, draws inlet air for the engine from the interior of fuselage 1 through inlets 23 and forces it into combustion chambers 25 under pressure. A steady stream of fuel, which may be gasoline, kerosene, alcohol or the like, is injected into the combustion chambers 25 through nozzles 27 individual thereto. The fuel injected through nozzles 27 mixes with the air in the combustion chambers and burns, causing an elevation of the temperature of the mixture and an accompanying expansion of the gases. During initial starting operations, the ignition of the fuel is accomplished by spark plugs, such as 29. After the engine has been started, the temperature in the combustion chambers 25 rises to approximately 1500° F. which causes combustion of the mixed air and fuel to take place spontaneously.

The burning gases flow between stationary guide vanes 31, which direct the gases onto movable vanes of a gas turbine 33 secured to and arranged to drive shaft 22. On leaving the turbine 33, the gases enter the jet or nozzle 13 formed by conical members 11, 35 and 37. In accordance with the known principles of jet engines, the expulsion of the gases through the jet or nozzle 13 in one direction produces a reaction in the opposite direction, which tends to drive the airplane forward. The gases continue to expand as they pass through nozzle 13, at a temperature of approximately 1300° F. and upwards, and thereby create an additional propelling force.

The engine may be of the turbo-jet type, propelled solely by jet reaction, or of the propeller-jet type, having a propeller secured to shaft 22 as indicated in Fig. 1.

Upon leaving nozzle 13, the hot exhaust gases enter the exhaust pipe 5 through which they are conducted to an opening at the rear of fuselage 1. The lines of flow of the gases in passing through nozzle 13 and entering exhaust pipe 5 have been indicated by lines 41. It will be noted that by reason of the structure herein provided, a minimum of interference is presented to the flow of the gases along these lines, and yet both longitudinal and angular displacement of member 11 and pipe 5 is freely permitted by reason of the flexibility of coupling member 15.

It is desirable that the flexible member 15 be protected from bombardment by the high velocity exhaust gases and carbon particles carried therein, due to the thin walled construction of this member. The velocity of flow and the temperature of the exhaust gases are, of course, far higher in a jet engine than encountered in the exhaust of an internal combustion engine, and therefore greater protection for the flexible coupling member 15 is required when used in conjunction with a jet engine than is required for a similar coupling used in the exhaust line of an internal combustion engine. The conical member 11 is necessarily constructed of heat resisting steel which is well adapted to withstand the bombardment by the exhaust gases and carbon particles. This member is therefore admirably suited for use as a baffle to protect the flexible member 15, and in the preferred form of construction illustrated herein this member serves the dual purpose of a baffle for safeguarding member 15 and of a conical surface forming a part of nozzle 13.

Openings as indicated at 42 may be provided in the end of coupling member 15 nearest engine 3, if desired, in order to cause cool air to be drawn between members 11 and 15 from the interior of fuselage 1 by the Venturi action created by the flow of exhaust gases past the aligned ends of member 11 and exhaust pipe 5.

The location of the engine 3 in the airplane fuselage is governed by weight distribution and other factors which often necessitate placement of the engine at a considerable distance from the rear of the fuselage. The exhaust pipe 5 consequently may have considerable length. The high temperature of the exhaust gases causes a high longitudinal expansion of the exhaust pipe to take place. As previously noted, the expansion of the exhaust pipe produces large stresses in the airplane fuselage if the pipe is fixedly secured thereto by ordinary means. These stresses are eliminated when the exhaust pipe is fixedly secured to the fuselage at but one point and is flexibly secured to the jet engine by the coupling member 15. The coupling member 15 also absorbs those stresses which result from angular displacement of the engine and the exhaust pipe due to flexing of the fuselage during flight, and which angular displacement may be considerable due to the long length of the exhaust pipe and fixed mounting thereof at but one point. It is preferred to fixedly secure the exhaust pipe 5 near the center of its length in order to minimize the stresses in the coupling member 15.

The conical members 11 and 37 are each provided with outwardly turned flanges which are bolted together, as indicated at 39. By removing the bolts securing these members to each other, and those securing engine 3 to rings 7, the engine may readily be removed from the fuselage. In replacing the engine, the flexible coupling member 15 permits any misalignment between the axis of engine 3 and the axis of exhaust pipe 5 to be compensated for. The exhaust pipe may be similarly readily replaced or removed.

It will thus be noted that the connector 15 and the associated parts are so arranged as to permit ready disconnection between the nozzle and the tail pipe, while at the same time providing a fluid-tight flexible connection therebetween. The annular corrugations in the tubing and welded end connections provide a uniform distribution of forces upon heat expansion and other strains to which the unit may be subjected. While an annularly convoluted connector, arranged as described, is thus preferred, it is to be understood that various types of flexible tubes may be employed, including tubing of the helical strip or other helically convoluted types.

It is further to be noted that the exhaust pipe 5 has a single connection to the frame through the intermediary of the flange 9. While the engine body, for rigidity, is connected at two points to the frame, these points are spaced closely together. Thus, in effect, the engine body and exhaust pipe are connected to the fuselage or aircraft frame at essentially two points, the stresses therebetween being fully compensated for by the flexible connector 15.

It is obvious that various changes may be made in the specific embodiment of the invention set forth for purposes of illustration, without departing from the spirit thereof. Accordingly the invention is not to be limited to the precise embodiment shown and described, but only as indicated in the following claims.

I claim:

1. In combination, a jet engine having an air impeller, a turbine, and a nozzle assembly, said nozzle assembly including an outer frusto-conical tubular section and an inner conical member providing an annular exhaust passage, a tail pipe peripherally and exteriorly overlying the smaller discharge end of said frusto-conical tubular section in nesting relation and in communication therewith, a section of annularly convoluted flexible metal tubing overlying at least a portion of said tubular section with one end secured to said tubular section and with the opposite end secured exteriorly to the adjacent end of said tail pipe whereby to provide a flexible fluid-tight connection between the tubular section of the nozzle assembly and said tail pipe, said tubular section extending substantially throughout the entire length of the flexible convoluted metal tubing to baffle the same against impingement of discharge gases, a fuselage structure embracing the jet engine nozzle and tail pipe assembly and support means for the assembly including frame means for the engine and a single support for the tail pipe widely spaced from the frame means supporting the engine whereby the flexible convoluted tubing section permits relative angular and longitudinal displacement between the engine unit and the tail pipe while maintaining a fluid-tight connection therebetween.

2. The combination as claimed in claim 1, wherein the tubular section includes a pair of frusto-conical sections secured together between the turbine and flexible convoluted tubing whereby separation of the frusto-conical sections permits either the engine assembly or the tail pipe to be separately removed as desired.

DAVID WENDELL FENTRESS.

References Cited in the file of this patent

UNITED STATES PATENTS

| Number | Name | Date |
|---|---|---|
| 1,781,108 | Grace | Nov. 11, 1930 |
| 2,337,038 | Fentress | Dec. 21, 1943 |
| 2,425,177 | Cronstedt | Aug. 5, 1947 |
| 2,432,359 | Streid | Dec. 9, 1947 |
| 2,516,671 | Bowers et al. | July 25, 1950 |

FOREIGN PATENTS

| Number | Country | Date |
|---|---|---|
| 279,138 | Great Britain | Nov. 17, 1927 |
| 392,852 | Great Britain | May 25, 1933 |
| 456,980 | Great Britain | Nov. 16, 1936 |